US010774868B2

(12) United States Patent
Thommes et al.

(10) Patent No.: US 10,774,868 B2
(45) Date of Patent: Sep. 15, 2020

(54) WIRE THREAD INSERT WITH REDRESSABLE MOUNTING TANG AS WELL AS ITS MANUFACTURING AND INSTALLATION

(71) Applicant: BÖLLHOFF VERBINDUNGSTECHNIK GmbH, Bielefeld (DE)

(72) Inventors: Holger Thommes, Strohn (DE); Andreas Marxkors, Hövelhof (DE)

(73) Assignee: Böllhoff Verbindungstechnik GmbH, Bielefeld (DE)

( * ) Notice: Subject to any disclaimer, the term of this patent is extended or adjusted under 35 U.S.C. 154(b) by 239 days.

(21) Appl. No.: 15/623,970

(22) Filed: Jun. 15, 2017

(65) Prior Publication Data
US 2017/0284444 A1 Oct. 5, 2017

Related U.S. Application Data

(62) Division of application No. 13/884,225, filed as application No. PCT/EP2011/068962 on Oct. 28, 2011, now Pat. No. 9,719,546.

(30) Foreign Application Priority Data

Nov. 8, 2010 (DE) .................. 10 2010 050 735

(51) Int. Cl.
*F16B 35/00* (2006.01)
*B21F 3/02* (2006.01)
(Continued)

(52) U.S. Cl.
CPC ............... *F16B 35/00* (2013.01); *B21F 3/02* (2013.01); *B21F 5/00* (2013.01); *B21F 99/00* (2013.01);
(Continued)

(58) Field of Classification Search
CPC .. F16B 35/00; F16B 37/12; B21F 3/02; B21F 5/00; B21F 99/00; B23G 9/00; B25B 15/00; B25B 27/143; Y10T 29/49826
(Continued)

(56) References Cited

U.S. PATENT DOCUMENTS 2,210,061 A * 8/1940 Caminez ............... B25B 27/143
29/227
2,360,047 A * 10/1944 Caminez ................... B21F 3/04
411/427
(Continued)

FOREIGN PATENT DOCUMENTS

GB 671787 A 5/1952
GB 985536 A 3/1965

OTHER PUBLICATIONS

Zylindrische Schraubenfedern aus runden Drähten; Gütevorshriften für faltgeformte Zugfedern; Helical springs made of round wire; specifications for cold coiled tension springs; DIN 2097; May 1973; 10 pages.
(Continued)

Primary Examiner — Hadi Shakeri
(74) Attorney, Agent, or Firm — Reising Ethington P.C.

(57) ABSTRACT

A wire thread insert comprises besides a cylindrical helix consisting of a plurality of coils a moving tang projecting into the interior of the helix for installing the wire thread insert into a receiving thread. The wire thread insert is connected to the cylindrical helix via a bending portion such that the moving tang can be redressed into the receiving thread after installation of the wire thread insert. The wire thread insert is installed by means of an installation tool with a mounting spindle, which installs the wire thread insert in the receiving thread via a moving shoulder and the moving tang. A compression blade provided at the mounting spindle
(Continued)

bends the moving tang back into the receiving thread while the mounting spindle is removed from the installed wire thread insert.

3 Claims, 13 Drawing Sheets

(51) Int. Cl.
    *B21F 5/00*         (2006.01)
    *B21F 99/00*       (2009.01)
    *B25B 27/14*       (2006.01)
    *F16B 37/12*       (2006.01)
    *B23G 9/00*        (2006.01)
    *B25B 15/00*       (2006.01)

(52) U.S. Cl.
    CPC ............... *B23G 9/00* (2013.01); *B25B 15/00* (2013.01); *B25B 27/143* (2013.01); *F16B 37/12* (2013.01); *Y10T 29/49826* (2015.01)

(58) Field of Classification Search
    USPC .......................................................... 81/442
    See application file for complete search history.

(56) References Cited

U.S. PATENT DOCUMENTS

| | | | | |
|---|---|---|---|---|
| 2,371,674 | A | | 3/1945 | Caminez |
| 2,745,457 | A | * | 5/1956 | Lang ................ F16B 39/32 29/240 |
| 2,782,674 | A | * | 2/1957 | Forster ............... F16H 37/12 411/423 |
| 4,553,302 | A | * | 11/1985 | Cosenza ............ B25B 27/143 29/240.5 |
| 5,212,865 | A | * | 5/1993 | Davis ................. B25B 27/143 29/240.5 |
| 5,214,831 | A | * | 6/1993 | Collins, Jr. ......... B25B 27/143 29/240.5 |
| 6,321,433 | B1 | * | 11/2001 | Cliff .................. B25B 27/143 29/240 |
| 6,644,149 | B2 | * | 11/2003 | Giannakakos ..... B25B 27/143 29/227 |
| 9,643,304 | B2 | * | 5/2017 | Szewc ................ B25B 27/143 |

OTHER PUBLICATIONS

DE Office Action for DE Application No. 102010050735.0 dated Jun. 28, 2018 (4 pages).

* cited by examiner

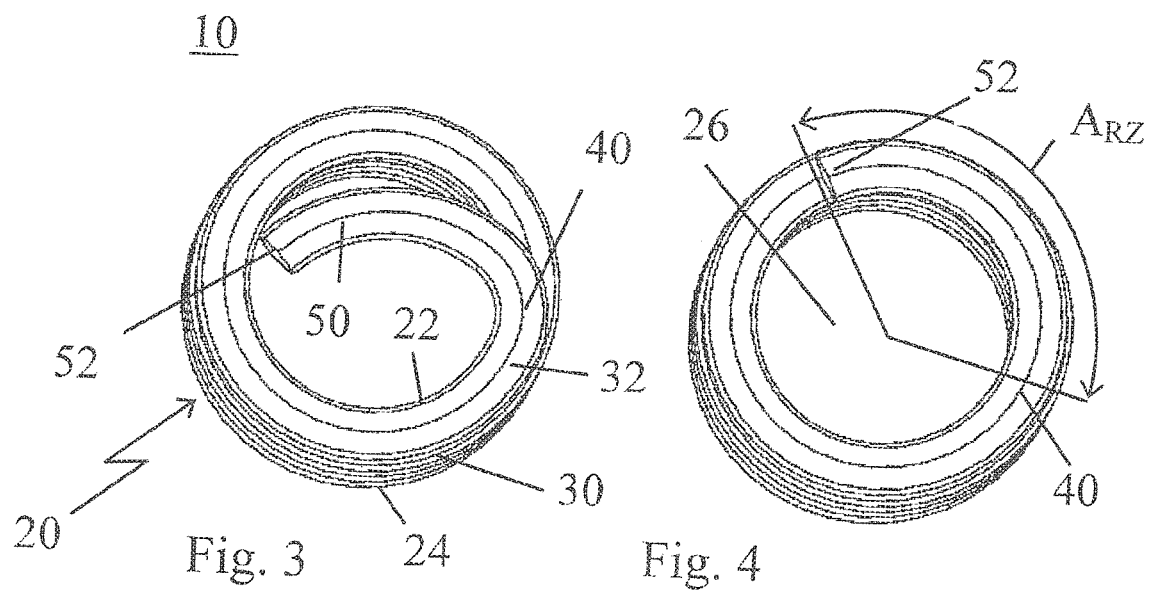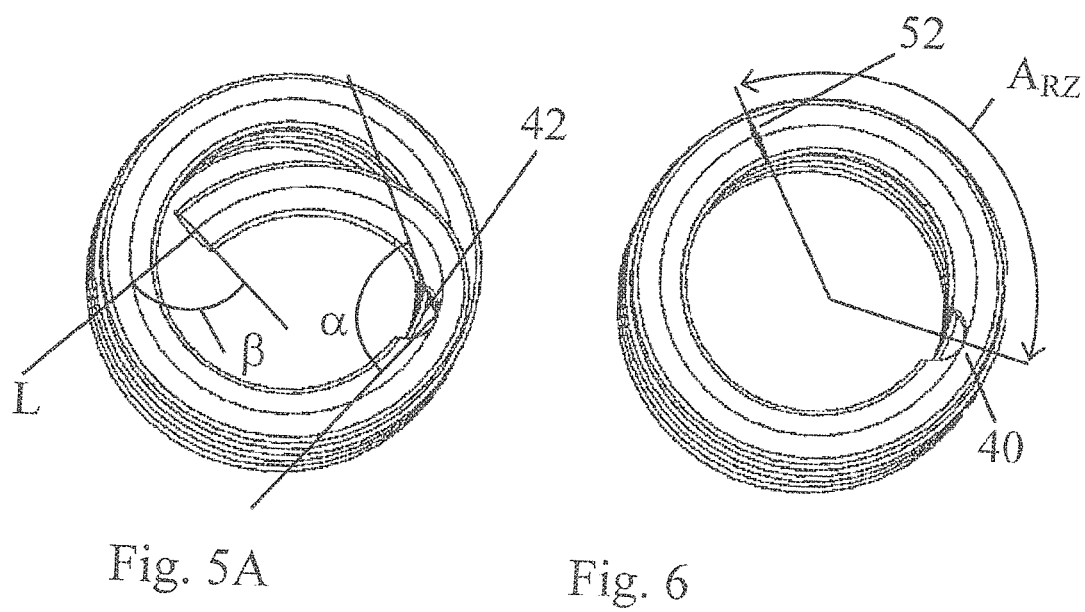

WIRE THREAD INSERT WITH REDRESSABLE MOUNTING TANG AS WELL AS ITS MANUFACTURING AND INSTALLATION

CROSS REFERENCE TO RELATED APPLICATIONS

This application is a divisional of U.S. patent application Ser. No. 13/884,225 filed Jul. 11, 2013 which is a national phase of PCT/EP2011/068962 filed Oct. 28, 2011 and claims the priority of German patent application DE 102010050735.0, filed on Nov. 8, 2010. The entire contents of these priority applications are incorporated herein by reference.

TECHNICAL FIELD

The present invention relates to a wire thread insert for mounting/installing in a receiving thread of a component, a component having a receiving thread in which the wire thread insert is arranged, an installation tool for this wire thread insert, an installation method of this wire thread insert in the component having a receiving thread, a manufacturing method for this wire thread insert as well as a device for manufacturing this wire thread insert.

BACKGROUND

Several wire thread inserts for mounting in a receiving thread of a component are known in the prior art. They are for example described in U.S. Pat. No. 2,363,789, EP-A-0 140 812 and EP-A-0 157 715. Regularly, the outer diameter of the cylindrical walls of the wire thread insert has to be chosen slightly greater than the outer diameter of the receiving thread of the component. Therefore, mounting of the wire thread insert into the receiving thread of the component has to take place involving a diameter reduction of the wire thread insert. In this way it is ensured that due to the elastic re-deformation of the wire thread insert after installation into the receiving thread a tight fit of the wire thread insert is achieved.

A half coil at the end of the cylindrical helix of the wire thread insert is retracted radially inwardly in the known way (EP-B1-0 228 981) to facilitate the screwing-in of the wire thread insert into the receiving thread. The smallest outer diameter of the retracted section of the wire thread insert should approximately be equal to or slightly greater than the corresponding outer diameter of the receiving thread in the component. Further, the wire cross-section of this known wire thread insert is tapered at the end to facilitate the screwing-in of the wire thread insert into the receiving thread and to avoid damages at the thread bore in the component.

Different embodiments of wire thread inserts are also disclosed in EP-B1-0 983 445. Thereto belongs for example the wire thread insert 1 shown in FIG. 1 consisting of a cylindrical helix 2 having a plurality of helically wound coils 3. A first coil 4 of this cylindrical helix 2 leads to a mounting tang/installation tang 6 projecting radially straight into the cylindrical helix 2. The mounting tang 6 is gripped by means of a suitable installation tool and the wire thread insert 1 is screwed into the receiving thread of the component therewith. The mounting tang 6 is removed after completion of the installation as the mounting tang 6 is broken off by means of the predetermined breaking point 5 in the first coil 4. In this way, a receiving thread is formed having a continuous screw-mountable wire thread insert.

In this construction of the wire thread insert 1 it is especially a disadvantage that the mounting tang 6 has to be broken and removed. At the automatic installation of such wire thread inserts 1 it may even be necessary to record the broken and removed mounting tang 6. It is furthermore disadvantageous that the wire thread insert has to be mounted into the receiving thread of the component in a certain orientation. This is because the wire thread insert 1 has to be screwed-in into the receiving thread with the mounting tang 6 ahead.

A further wire thread insert 1 which is known from the prior art is shown in FIG. 2. In contrast to the wire thread insert of FIG. 1, the wire thread insert of FIG. 2 does not comprise a mounting tang. Instead, a moving groove 7 is provided in the first coil 4 of the wire thread insert. An installation tool of the wire thread insert engages this moving groove 7 to screw the wire thread insert 1 into the receiving thread of the component. The free end of the first coil 4 of the wire thread insert 1 is provided with a tapering 8 to support this screw-in process and also the entering of the wire thread insert 1 into the receiving thread. The construction of the wire thread insert 1 according to FIG. 2 permits only a very sophisticated automated mounting into the receiving thread of the component. The wire thread insert 1 is inserted by means of a preload cartridge at an automated assembly. The insertion requires an excessive monitoring of the process. Further, the wire thread insert 1 of FIG. 2 can be reduced in its diameter during the installation only restrictedly so that the wire thread insert 1 applies lower holding forces after the installation in the receiving thread took place compared to for example the wire thread insert 1 of FIG. 1.

Starting from the wire thread inserts of the prior art, the object of the present invention is providing a wire thread insert which is installable into a receiving thread of a component with lesser effort and more process reliable compared to the prior art. It is a further object of the present invention to provide a respective installation method, an installation tool, a manufacturing method and a manufacturing device for such a wire thread insert.

SUMMARY

The above mentioned technical problems are solved by a wire thread insert according to the independent patent claim 1, a component having a receiving thread in which this wire thread insert is installed according to the independent patent claim 6, an installation tool for such a wire thread insert according to the independent patent claim 7, an installation method for this wire thread insert according to the independent patent claim 13, a manufacturing method for this wire thread insert according to the independent patent claim 17 as well as by a device for manufacturing this wire thread insert according to the independent patent claim 21. Advantageous embodiments and further developments of the present invention are derivable from the present description, the figures as well as the appending claims.

The inventive wire thread insert for mounting/installing in a receiving thread of a component comprises the following features: a cylindrical helix having a plurality of helically wound coils of a wire, the helix having a first and a second end, wherein a first coil provided at the first end has a moving tang projecting into an interior of the helix via a bending portion and the moving tang is inseparably, i.e. not removable, connected to the first coil and redressable from the interior of the helix via the bending portion.

The present invention provides a wire thread insert which is advantageously installable in the receiving thread of a component via its moving tang. This moving tang enables applying a sufficient high torque as well as the desired diameter reduction of the wire thread insert to facilitate the installation of the wire thread insert in the receiving thread. In contrast to the prior art, the moving tang has not to be removed from the wire thread insert. Instead, the moving tang is bent back, bent down, bent over or redressed, respectively, into the pathway of the first coil via the bending portion and thus, also into the receiving thread of the component. For this purpose, the wire thread insert with bending portion and moving tang is formed such that the bending portion allows a redressing of the moving tang without breaking thereby. Further, the moving tang is connected to the wire thread insert via the bending portion in a sufficient stable way so that a screwing in of the wire thread insert into the receiving thread of the component is not affected.

The present invention is further preferably characterised in that the moving tang is redressable permanently into the receiving thread of the component. This redressing of the moving tang is realised by means of the installation tool of the wire thread insert. An elastic resetting of the moving tang into the interior of the helix of the wire thread insert is prevented during the redressing of the moving tang. This ensures that the moving tang can be bent radially outwardly into the receiving thread of the component over and above the envelope shape of a screw later to be inserted into the receiving thread or the envelope shape of a thread plug gauge and can stay there. Thereby it is guaranteed that a screw-in moment of a screw in the receiving thread of the component is only negligibly affected and an accuracy to gauge of the wire thread insert within the receiving thread of the component is ensured.

Thus, it is preferred to provide the moving tang of the wire thread insert in the shape of a circular arc whose tang radius is equal to a radius of the first coil of the cylindrical helix. By means of this shaping it is ensured that the redressable moving tang resumes the first coil of the cylindrical helix.

It is further preferred that the moving tang has a continuous front end compression face at its free end, which is arranged within the radial plane of the helix in an angle of 90° to 60° related to the longitudinal axis of the wire.

The moving tang is redressed radially into the receiving thread of the component during the assembly of the wire thread insert. Additionally, it is preferred to impinge the moving tang via the mentioned compression face with a compression force, preferably tangential to the longitudinal axis of the wire, so that a mechanical tension superposition results within the bending portion of the wire thread insert. Consequently, the moving tang is compressed into the first coil of the cylindrical helix of the wire thread insert during the redressing via the compression face. This compression ensures a permanent redressing of the moving tang so that the moving tang does not or negligible low spring back elastically into the interior of the cylindrical helix. In this way, the moving tang may be bent and/or calibrated radially outwardly permanently over and above the envelope shape of a screw to be inserted into the receiving thread and a thread plug gauge.

According to another preferred embodiment of the inventive wire thread insert, the wire in the bending portion between the first coil and the moving tang is modified mechanically, geometrically, thermally, chemically, in another way or not at all compared to the wire of the first coil so that a redressing of the moving tang is facilitated. In this context, it is for example preferred to provide the bending portion with a redressing groove. This redressing groove leads in a geometrical way to a reduction of the material resistance in the bending portion during the redressing of the moving tang. In a further embodiment, the bending portion is heated to reduce the strength of the wire in the bending portion and thus to improve the bending properties of the bending portion. Hence, all methods are appropriate which reduce the yield strength of the wire in the bending portion in such a way that a redressing of the moving tang is supported.

The present invention comprises also a component having a receiving thread, in which a wire thread insert according to one of the above mentioned embodiments is arranged.

Further, the present invention discloses an installation tool for the above described wire thread insert in a receiving thread of a component, the tool having the following features: a rotatable mounting spindle with a drive end for rotating the mounting spindle and a functional end for installing the wire thread insert, wherein the functional end comprises a moving shoulder by means of which the wire thread insert is screwable into the receiving thread via the moving tang and a compression blade having a face by means of which the moving tang of the wire thread insert is redressable.

The inventive rotatable mounting spindle is constructed with its functional end such that on the one hand the wire thread insert is easy installable in the receiving thread of the component via the moving tang. On the other hand, the compression blade of the functional end of the mounting spindle serves to redress the moving tang permanently from the cylindrical helix of the wire thread insert. Thereby, the necessity of breaking-off the moving tang and obstructions connected therewith during an automated installation are omitted.

It is preferred that the compression blade and its face extend in radial direction related to the mounting spindle and project over and above an outer diameter of the mounting spindle so that the moving tang is permanently redressable into the receiving thread of the component. This compression blade engages the already above described front end compression face of the moving tang while rotating the mounting spindle contrary to the screw-in direction of the wire thread insert into the receiving thread. The compression blade compresses the moving tang so that elastic reset forces of the moving tang, especially of the bending portion, into the interior of the cylindrical helix are almost nullified and the moving tang remains in the receiving thread of the component.

The functional end of the installation tool comprises according to another preferred embodiment a redressing shoulder by means of which the moving tang during the rotation of the mounting spindle is radially outwardly movable and in combination with the compression blade redressable. It is further preferred that the mounting spindle has an outer diameter at the functional end so that the wire thread insert may be spindled or slipped on the mounting spindle. According to another embodiment of the installation tool, its compression blade is arranged radially and/or axially moveable related to the mounting spindle to engage or disengage the moving tang.

The present invention further discloses an installation method of a wire thread insert having a redressable moving tang by means of an installation tool into a receiving thread of a component, the method comprising the following steps:

Spindling or slipping the wire thread insert on a functional end of a mounting spindle of the installation tool, screwing-in of the wire thread insert into the receiving thread by rotating the mounting spindle in a first rotational direction, redressing/bending back the moving tang into the receiving thread by rotating the mounting spindle in a second rotational direction and spindling off or removing the mounting spindle from the wire thread insert with redressed moving tang.

For screwing-in the wire thread insert into the receiving thread, the moving tang of the wire thread insert preferably locks itself at a moving shoulder of the functional end of the mounting spindle so that the wire thread insert is rotatable by the mounting spindle. The moving shoulder at the functional end of the mounting spindle ensures in this way that a sufficient high torque is generated for installation of the wire thread insert in the receiving thread. A radial bending-up of the moving tang occurs preferably by a bending-up shoulder at the functional end of the mounting spindle to redress the moving tang into the receiving thread. The radial bending-up occurs within a radial plane of the cylindrical helix of the wire thread insert, wherein the moving tang is radially outwardly bent up by the bending-up shoulder.

The present invention discloses further a manufacturing method of the above described wire thread insert with redressable moving tang. This manufacturing method comprises the following steps: providing a wire having an circular arc shaped curved free end, locking the circular arc shaped curved free end at a front end of a winding spindle and winding the wire onto the winding spindle so that a cylindrical helix is manufactured having a plurality of helically wound coils of the wire with a curved moving tang arranged inwardly related to the helix, and cutting-off the wound wire thread insert so that a further wire having a semicircular wound free end is manufactured.

A known wire for wire thread inserts is fixed at the winding spindle with a circular arc shaped free end. Preferably, the circular arc of the curved end extends over an arc angle of 10° to 180°, preferably 30° to 120°, starting in the bending portion to the free end of the moving tang. The front end of the winding spindle is adapted such that despite the locking and the subsequent winding of the wire, a curved moving tang is manufactured at the front end of the wire thread insert, which is arranged in the interior of the cylindrical helix. This moving tang is not shaped straight radially inwardly related to the interior of the cylindrical helix of the wire thread insert compared to known moving tangs. Further, the first coil of the cylindrical helix has no predetermined breaking point or groove, respectively, via which the moving tang could be removed afterwards.

According to a preferred embodiment of the manufacturing method, an unwinding of the wire thread insert from the winding spindle and a tilting of the wire thread insert related to its longitudinal axis compared to the longitudinal axis of the winding spindle occurs before cutting-off. This course of action ensures that the cutting-off of the wound wire thread insert is subsequently realisable by a shear procedure with at least one blade, preferably a first and a second blade. Compared to known methods, the wire of the wire thread insert is not pinched-off, but instead is sheared-off or cut-off, respectively. This cutting-off creates a continuous front end compression face at the free end of the moving tang, as described above.

According to another optional embodiment of the inventive manufacturing method, a modification of the wire in the bending portion takes place between the first coil of the wire thread insert and the moving tang mechanically, geometrically, thermally, chemically or in another way compared to the wire in the first coil, so that the redressing of the moving tang is facilitated. By means of mechanical, geometrical, thermal, chemical or other conceivable methods, the strength and/or yield strength of the wire in the bending portion of the wire thread insert is reduced. This ensures a redressing of the moving tang from the interior of the cylindrical helix of the wire thread insert by means of a lower force compared to a bending portion which was not modified. A geometrical modification comprises for example a tapering of the wire in the bending portion while a thermal modification by heating the wire in the bending portion may reduce its yield strength and/or strength. With the same purpose and the same function, mechanical, chemical or other modifications of the wire in the bending portion are applicable solely or in combination.

Further, the present invention discloses a device for manufacturing the above described wire thread insert, which has the following features: a wire supply for a wire to be wound and a rotatably arranged winding spindle having a front end locking construction for the wire to be wound and a cutting construction with at least a first blade by means of which the wire of the wound wire thread insert is removable via a shear procedure. It is preferred to provide the device for manufacturing the wire thread insert with a pointing assembly. By means of this pointing assembly, the wire of the bending portion between the first coil of the wire thread insert and the moving tang is modified mechanically, geometrically, thermally, chemically or in another way compared to the wire of the remaining wire thread insert to facilitate a redressing of the moving tang. Such a pointing assembly comprises for example a mechanical assembly to generate a groove, preferably a round or angular groove or a tapering in the wire of the bending portion. According to another embodiment, the device for manufacturing the wire thread insert comprises a thermal pointing assembly which heats the wire of the bending portion by means of electrical induction, by means of a laser or any other suitable heat source so that the material of the wire in the bending portion is modified such that a later redressing of the moving tang from the interior of the cylindrical helix of the wire thread insert is supported or facilitated, respectively.

BRIEF DESCRIPTION OF THE DRAWINGS

The present invention is now described with reference to the accompanying drawings in more detail. It shows.

DETAILED DESCRIPTION OF PREFERRED EMBODIMENTS

Figure 1:
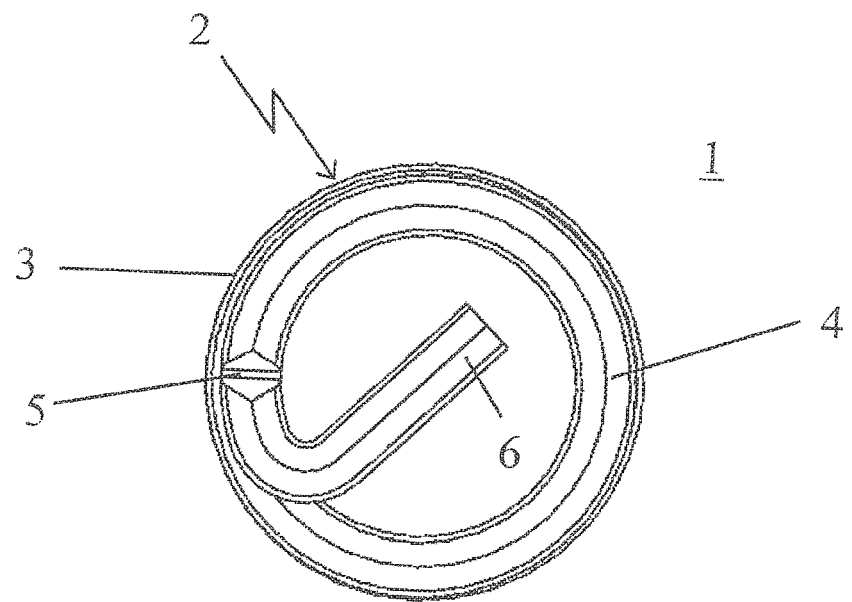
FIG. 1 a wire thread insert according to the prior art having a moving tang projecting radially inwardly and a predetermined breaking point for breaking off the moving tang, FIG. 2 a wire thread insert of the prior art having a moving groove at the free end of the wire thread insert, FIG. 3 a preferred embodiment of the inventive wire thread insert with redressable moving tang, FIG. 4 the wire thread insert of FIG. 3 with redressed moving tang, FIG. 5A a further embodiment of the inventive wire thread insert with redressable moving tang, FIG. 5B the embodiment of FIG. 5A with a depiction of the tang bending radius, FIG. 6 the wire thread insert of FIG. 5 with redressed moving tang, FIG. 7 a further embodiment of the inventive wire thread insert with redressable moving tang, FIG. 8 a further embodiment of the inventive wire thread insert with redressable moving tang, FIG. 9 a schematic depiction of a preferred embodiment of the mounting spindle of the installation tool with a wire thread insert with redressable mounting tang placed thereon, FIG. 10 a schematic depiction of a preferred construction of the functional end of the mounting spindle, FIG. 11 a schematic depiction of a preferred sequence during the installation of the inventive wire thread insert, FIG. 12 a depiction of a preferred further sequence during the installation of the inventive wire thread insert, FIG. 13 a flowchart of the preferred installation method for the wire thread insert with redressable moving tang, FIG. 14 a schematic depiction of the preferred device for manufacturing the wire thread insert with redressable moving tang, FIG. 15 a flowchart of a preferred manufacturing method of the wire thread insert with redressable moving tang, FIG. 16 a schematic depiction of a preferred construction of the functional end of the mounting spindle, FIG. 17 a further embodiment of the inventive wire thread insert with redressable moving tang, FIG. 18 a further embodiment of the inventive wire thread insert with redressable moving tang, FIG. 19 a further embodiment of the inventive wire thread insert with redressable moving tang, FIG. 20 a further embodiment of the inventive wire thread insert with redressable moving tang, FIG. 21 a further embodiment of the inventive wire thread insert with redressable moving tang, FIG. 22 a further embodiment of the inventive wire thread insert with redressable moving tang, and FIG. 23 a further embodiment of the inventive wire thread insert with redressable moving tang.

The inventive wire thread insert 10 is wound from a wire of known material and of known cross-sectional shape. Referring to the FIGS. 3 to 9 and 17-23, the wire thread insert 10 comprises a cylindrical helix 20 consisting of a plurality of helically wound coils 30. The helix 20 has a first end 22 and a second end 24. A moving tang 50 is arranged at the first end 22 of the cylindrical helix 20 which protrudes into the interior of the cylindrical helix 20 in a radial plane of the cylindrical helix 20.

A moving tang 50 is connected to a first coil 32 of the cylindrical helix 20 at its first end 22 via a bending portion 40. The moving tang 50 protrudes not straight radially into the interior of the cylindrical helix 20, as can be seen from FIGS. 3, 5, 7 and 9. Instead, the moving tang 50 has the shape of circular arc. The circular arc of the moving tang 50 has preferably the same radius as the cylindrical helix 20 so that the moving tang 50 is permanently redressable from the interior of the cylindrical helix 20 into the pathway of the first coil 32. It is further preferred to form the circular arc of the moving tang 50 with a radius that differs at the maximum by ±10% from the radius of the cylindrical helix 20.

The bending portion 40 has the function to connect the moving tang 50 with the rest of the wire thread insert 10 bendable and with tensile rigidity. Thereby it is ensured that a sufficient high torque can be applied to the wire thread insert 10 via the moving tang 50 during the installation of the wire thread insert 10 into a receiving thread A of a component B. Based on this constructive basis, the wire thread insert 10 can be drawn-in into the receiving thread A by means of the moving tang 50 without that the moving tang 50 breaks.

Further, the bending portion 40 ensures that the moving tang 50 is permanently redressable into the receiving thread A of the component B or generally into the pathway of the first coil 32. For this purpose, the bending portion 40 has the same mechanical, thermal, chemical and geometrical properties as the wire of the cylindrical helix 20. By means of an appropriate installation tool (see below), the moving tang 50 is bent-out in radial direction from the interior of the cylindrical helix 20 during the redressing but without that the moving tang 50 returns afterwards elastically back into the interior of the cylindrical helix 20. This condition is illustrated in FIGS. 4 and 6.

Preferably, the wire is modified in its bending portion 40 in its bending properties compared to the wire of the cylindrical helix 20 to support the redressing of the moving tang 50 into the receiving thread A or into the pathway of the first coil 32. This modification of the bending portion 40 is caused according to different embodiments of the present invention mechanically, geometrically, thermally, chemically or in another way.

According to another preferred embodiment, the wire of the bending portion 40 is tapered in its cross-section compared to the wire of the cylindrical helix 20. According to one alternative, this is realised with a groove or notch 42, preferably a rounded or angular groove. The tapering or groove 42 is formed such that a low groove factor arises during the redressing of the moving tang 50 and thus the moving tang 50 does not break-off during the redressing. It is further preferred to arrange the groove 42 on the radially inner or on the radially outer side of the bending portion 40. According to another alternative embodiment, a one-sided or a multi-sided cross-sectional tapering of the bending portion 40 takes place for 10 to 80%, preferably for approximately 50%, compared to the wire of the cylindrical helix 20.

Figure 2:
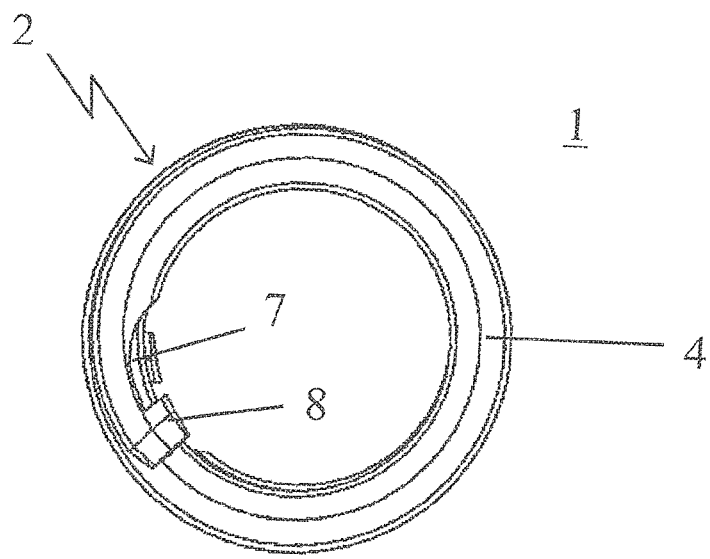
Figure 5B:
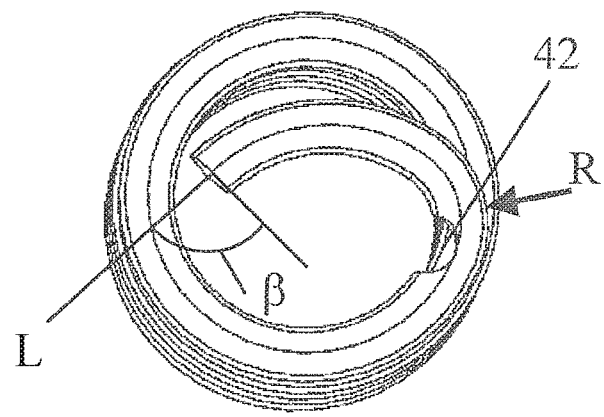

According to another preferred embodiment of the wire thread insert 1 not shown, the groove 42 is formed as a moving groove. The moving groove is formed and positioned such that it may enter a moving blade provided in the shape of the screw-in tool for screwing-in the wire thread insert 1 into a receiving thread and that it can be locked therein by positive locking. An example for such a moving groove is shown in FIG. 2 at reference sign 7. Due to this shape, the side of the moving groove located upstream in the screw-in direction of the wire thread insert 1 forms an undercut at which the moving blade abuts with a positive locking. The radially inwardly bent moving tang 50 supports the engagement of the moving blade into the moving groove. Thus, the moving groove realises two functions at the same time. On the one hand, the moving groove allows the engagement and locking of the moving blade of a screw-in tool for the wire thread insert. On the other hand, the moving groove constitutes a tapering of the bending portion 40 which supports a redressing of the moving tang 50 into the receiving thread of the component.

The bending portion is treated mechanically, to reduce the mechanical resistance moment or the elastic restoring moment of the wire in the bending portion 40, for example from up to 2000 MPa to approximately 400 MPa. Suitable procedures comprise notching, milling, punching, forging, grinding, polishing, cold-forming, etching, lapping to reduce the cross-section of the bending portion 40. At the same time, it must be ensured that the corrosion properties in the bending portion 40 are restored after the treatment.

According to another embodiment of the present invention, the wire of the bending portion 50 is modified thermally or chemically or in another way so that its bending strength is reduced compared to the wire of the cylindrical helix 20. Thus, for example, its strength is influenced via a local thermal treatment of the bending portion 40 or of a section of the bending portion 40. In this way, the yield strength of the wire in the bending portion 40 is reduced, for example to 20% to 90%, further preferred to 20% to 40%. The thermal treatment is realised according to different embodiments by electrical induction, by laser irradiation or by applying another heat source.

According to another preferred embodiment of the bending portion 40, its wire is untreated, thus neither mechanically, geometrically, chemically, physically nor in any other way and corresponds in its properties to the wire of the cylindrical helix 20.

Based on the above described embodiments of the bending portion 40 and the shape of the moving tang 50, the moving tang 50 of a wire thread insert 10 installed in the receiving thread A of the component B may be bent-out of the interior of the cylindrical helix 20 so that the receiving thread A with the wire thread insert 10 is true to gauge. This means that a screw or a thread plug gauge is screwable into the receiving thread A having the wire thread insert 10 using a negligible low additional torque or frictional moment, respectively, due to the redressed moving tang 50. The accuracy to gauge of the receiving thread A having the wire thread insert 10 is provable in that a manual screwing-in of the thread plug gauge according to tolerance class 6H, preferably tolerance class 5H, is guaranteed.

According to different embodiments of the present invention, the moving tang 50 is formed in different lengths. In the redressed condition according to FIGS. 4 and 6, the moving tang 50 extends over a circular arc $A_{RZ}$ from 10° to 180°, preferably 30° to 120°, starting in the bending portion 40 to the free end of the moving tang 50.

Further, the bending portion 40 has a certain tang bending radius. The size of the tang bending radius determines at which position the moving tang 50 is arranged in the interior of the cylindrical helix 20. It is preferred to choose the tang bending radius in the manner that the moving tang 50 and the first coil 32 include an angle α from 20° to 50°, preferably 60° to 90° (confer FIG. 5A). Alternatively to this it is also preferred to adjust the tang bending radius R of the moving tang 50 specifically. The tang bending radius R (cf. FIG. 5B) describes the radius by means of which the moving tang 50 is radially bent inwardly. This tang bending radius R is measured for example by means of radius gauges. The tang bending radius R has a size of $0,5\ P \le R \le 0,45\ D_A$. In this equation denotes P the pitch of the wire in the helix 20 and $D_A$ the outer diameter of the helix 20.

The moving tang 50 comprises further preferred at the front end of its free end a continuous compression face 52. The compression face 52 is formed unitary so that it is aligned in a common angle β to the longitudinal axis L of the wire of the moving tang 50. The angle β is exemplary shown in FIG. 5. The angle β amounts to 80° to 130° to the longitudinal axis L of the wire of the moving tang 50 within a radial plane of the cylindrical helix 20.

Figure 7:
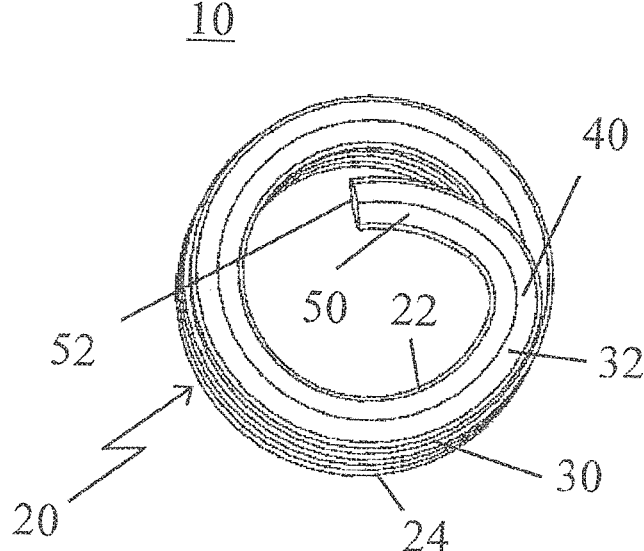
Figure 8:
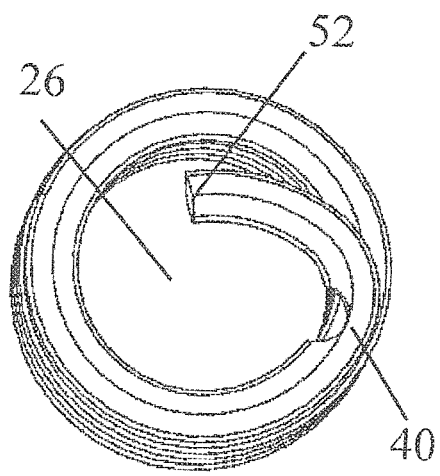

Referring to FIGS. 7 and 8, the moving tang 50 is formed shorter compared to FIGS. 3 and 4. Further, FIGS. 3, 4 and 7 illustrate a wire thread insert 10 whose bending portion 40 is electrically, chemically, thermally or not at all modified. In FIGS. 4 and 6, the moving tang 50 is permanently redressed into the first coil 32 without springing back elastically into the interior of the cylindrical helix 20.

Figure 11:
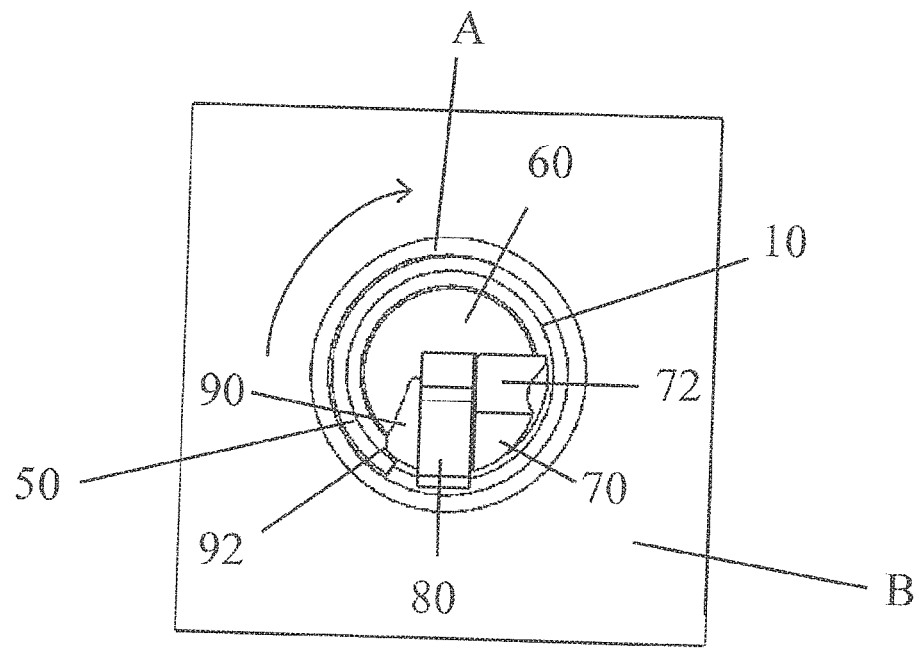
Figure 12:
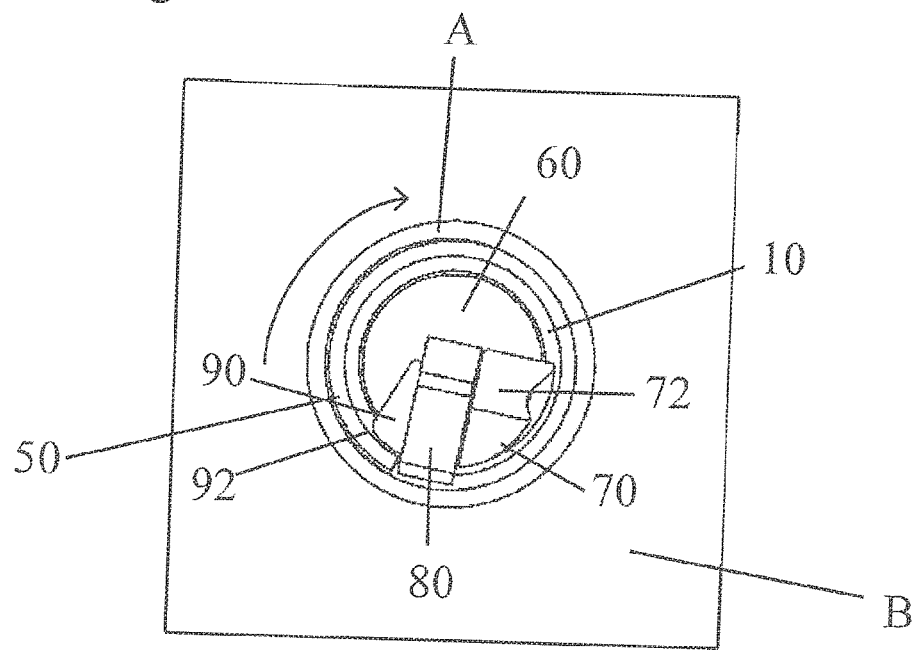
Figure 13:
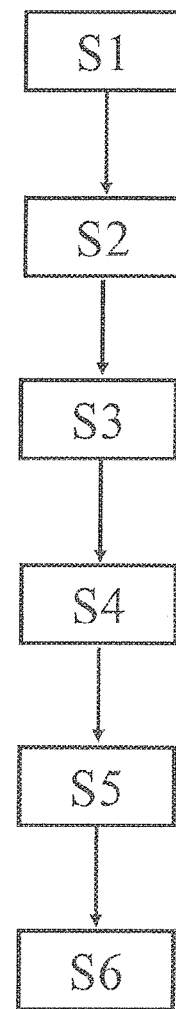

The present invention comprises further the component B with receiving thread A in which the above described wire thread insert 10 is installed. In the installed condition, the moving tang 50 is redressed or still arranged in the interior of the cylindrical helix 20. Exemplarily, FIGS. 11 and 12 show component A with installed wire thread insert 10.

Figure 9:
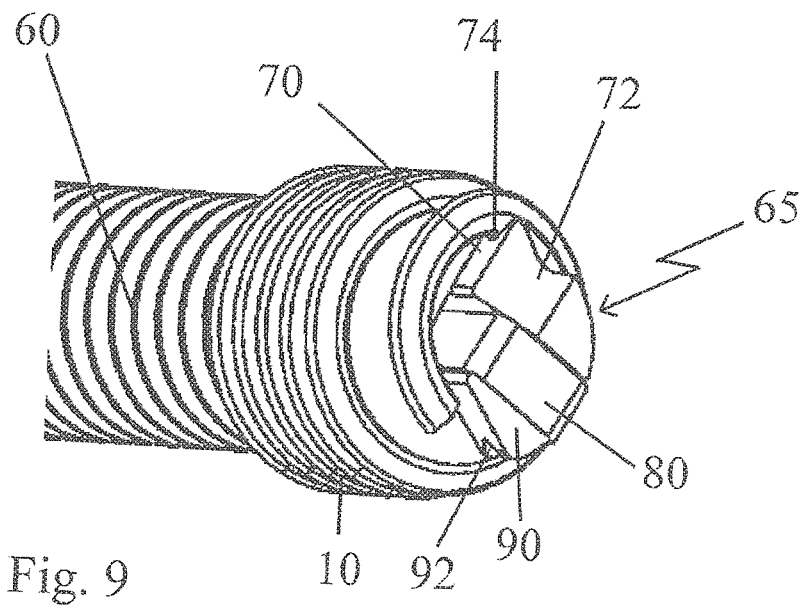

The wire thread insert 10 is installed in the receiving thread A of the component B by means of an installation tool. The installation tool comprises a rotatable mounting spindle 60 having a driving end for rotating the mounting spindle 60 and a functional end 65 for installing the wire thread insert 10. The functional end 65 of the mounting spindle 60 is shown in FIG. 9 in a preferred embodiment. On the mounting spindle 60, especially on the functional end 65, the wire thread insert 10 was here already spindled or slipped thereon (step S1). To this end, the mounting spindle 60 comprises at its functional end 65 an outer diameter adapted to the inner diameter of the wire thread insert 10 so that the wire thread insert 10 is screwable or placeable on the mounting spindle 60.

The functional end 65 is preferably located on the front end of the mounting spindle 60. It comprises a moving driving shoulder 70 by means of which the wire thread insert 10 is screwable into the receiving thread A via the moving tang 50. Further, the functional end 65 comprises a compression blade 80 by means of which the moving tang 50 of the wire thread insert 10 is redressable. Preferably, the compression blade 80 cooperates with a redress shoulder 90.

Figure 10:
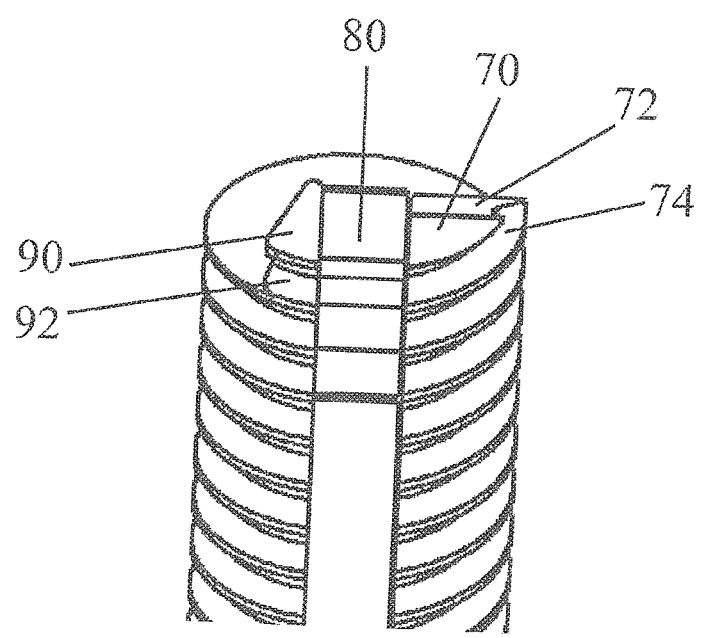

At the end of the spindling or slipping of the wire thread insert on the mounting spindle 60 (step S1), the moving tang 50 locks (step S2) itself preferably behind the moving shoulder 70. To facilitate the locking (step S2) and to ensure a trouble-free engagement of the moving tang 50 on the moving shoulder 70 an engagement slant 72 is arranged on the moving shoulder 70 (see FIGS. 9 and 10). The moving tang 50 is elastically deformed during the further screwing on the mounting spindle 60 and slides on the front end over the moving shoulder 70, the compression blade 80 as well as over the redress shoulder 90. To achieve a low-drag sliding of the moving tang 50, the edges of the mentioned contact faces at the functional end 65 of the mounting spindle 60 are broken such that a hooking in or jamming of the moving tang is prevented. Due to the elasticity of the moving tang 50, the moving tang 50 snaps behind the moving shoulder 70 of the mounting spindle 60 into a tension free position and is thereby locked.

The spindled or slipped-on wire thread insert 10 is positioned at the receiving thread A. Due to the inward winding of the first coil 30 in the bending portion 40, an ideal entering of the wire thread insert 10 into the receiving thread A is ensured. The screwing in (step S3) of the wire thread insert 10 into the receiving thread A takes place by means of a rotating movement of the mounting spindle 60 via the mounting tool. In a wire thread insert 10 for a right hand thread, the screwing-in takes place in a clockwise direction. For a left hand thread, the mounting spindle 60 is turned counter-clockwise, respectively, to install the wire thread insert 10.

By screwing-in the wire thread insert 10 into the receiving thread A, the moving tang 50 abuts the moving shoulder 70 of the functional end 65. This ensures an ideal transmission of the torque to be applied, whereby the wire thread insert 10 is brought into the desired depth position within the receiving thread A. For a better fixation of the moving tang 50 on the moving shoulder 70, the moving shoulder 70 comprises a moving groove 74. The moving tang 50 snaps into this moving groove 74 whereby an additional stability for the torque transmission on the wire thread insert 10 is obtained.

The depth position of the wire thread insert 10 is adaptable via an adjustable depth stop depending from the length of the wire thread insert 10 as well as the desired end position of the wire thread insert in the receiving thread A. After the depth position is reached, the mounting spindle 60 is screwed counter-clockwise out of the wire thread insert 10 (steps S4 to S6). Immediately after changing the rotational direction of the mounting spindle 60, the moving shoulder 70 is disengaged from the moving tang 50 and the moving tang 50 is radially bent open by the redress shoulder 90 due to its geometry (step S4). The bent open condition obtained by the redress shoulder 90 is shown in FIG. 11. In this condition, the moving tang 50 is guided between the receiving thread A and the groove 92 of the redress shoulder.

By further rotating the mounting spindle 60 in the counter-clockwise direction, the compression face 52 of the moving tang 50 abuts the compression blade 80 (confer FIG. 12). For this purpose, the compression blade 80 extends in radial direction related to the mounting spindle 60 and projects over an outer diameter of the mounting spindle 60. Based on this construction, the moving tang 50 is permanently redressable into the receiving thread of the component B.

In case the mounting spindle 60 is rotated further in the direction of the arrow according to FIGS. 11 and 12, the mounting tang 50 is compressed by the compression blade 80 via the compression face 52 (step S5). The moving tang 50 is preferably held between the receiving thread A and the groove 92 of the redress shoulder 90 so that the moving tang 50 does not give way to the compression force. Due to the clinching force impact of the moving tang 50 superimposed with the bending stress, a multi-axial stress condition is created in the bending portion 40. Due to this multi-axial stress condition, the material yield strength of the wire in the bending portion is preferably clearly exceeded so that the moving tang 50 is redressed permanently into the receiving thread A or in the continuation of the first winding 32, respectively. Thereby, the first coil 32 is not damaged.

After the compression in step S5 is completed, the compression blade 80 disengages from the compression face 52 and the mounting spindle 60 is screwed-out or removed in another way from the wire thread insert 10.

Figure 16:
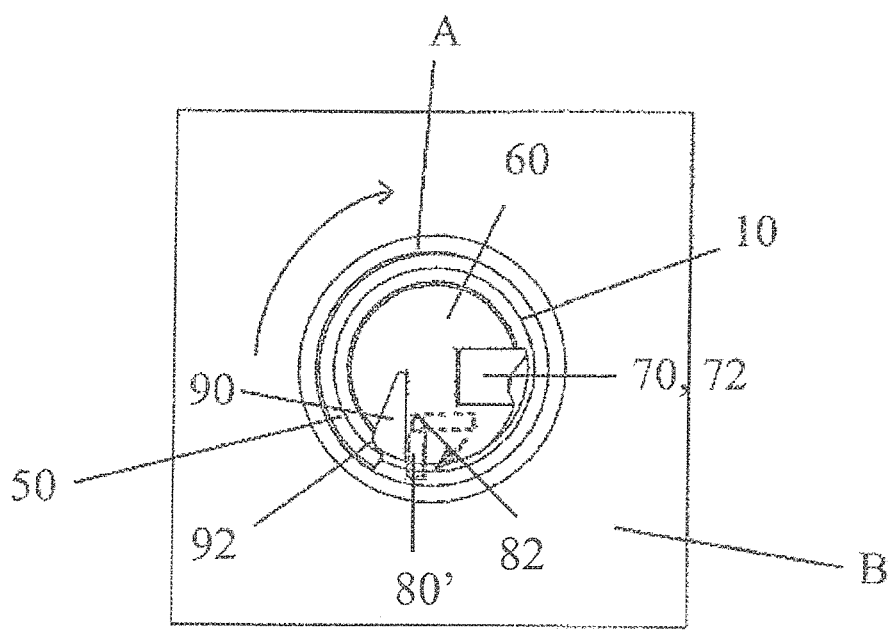

A further preferred embodiment of the mounting spindle 60 is shown in FIG. 16. This embodiment works in them the same way as described above. In contrast to the above described mounting spindle 60, the compression blade 80' is arranged tangentially pivoting into the circumferential shape of the wire thread insert to be installed. To this end, the compression blade 80' is arranged pivotably around the point 82. According to one embodiment, the compression blade 80' is connected with a rotational axis which extends axially in the mounting spindle 60 and is driveable by a drive means. As the point 82 is arranged eccentrically in relation to the front end of the mounting spindle, the radial outer end of the compression blade 80' reaches the envelope curve of the component thread during a pivoting movement. In a mounting procedure of the wire thread insert, the compression blade 80' engages during the turning back of the mounting spindle 60 the compression face 52 of the moving tang 50 after the redress shoulder 90 has bent the moving tang 50 outwardly. For this purpose, the compression blade 80' is rotated from the position illustrated by dotted lines into the position illustrated by continuous lines (see FIG. 16). As the compression blade 80' is rigid in the position illustrated by the continuous lines, rotating of the mounting spindle 60 in the direction of the arrow compresses the moving tang 50 so that the moving tang 50 is redressed permanently.

Figure 14:
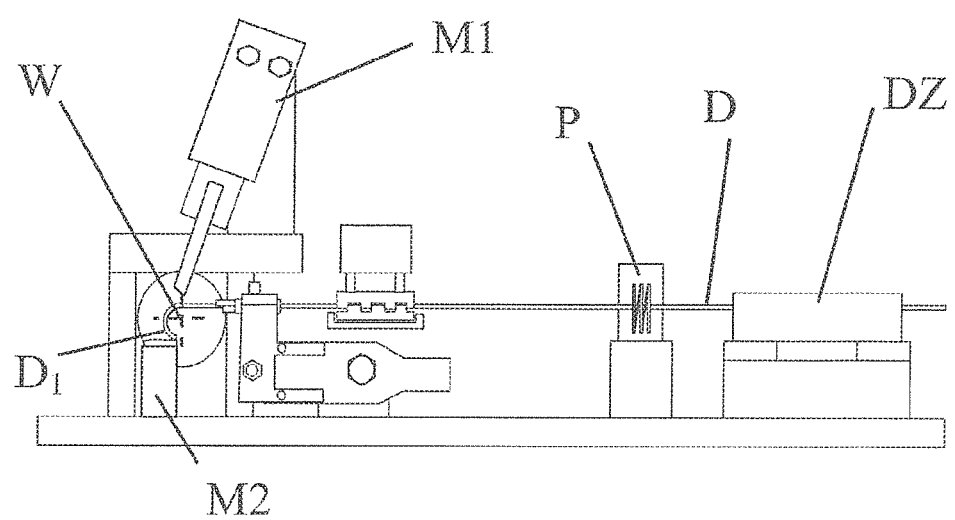
Figure 15:
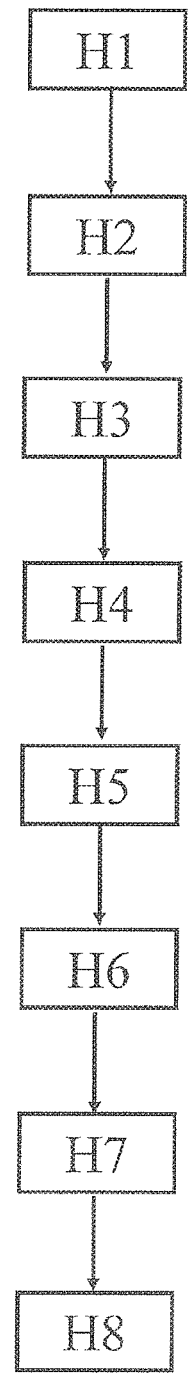
Figure 17:
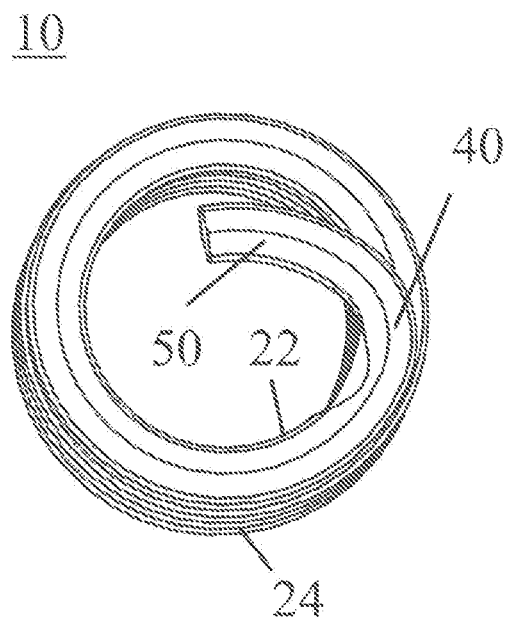
Figure 18:
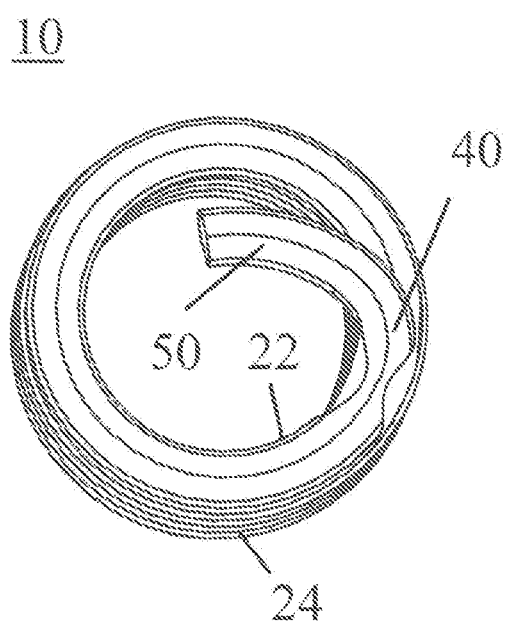
Figure 19:
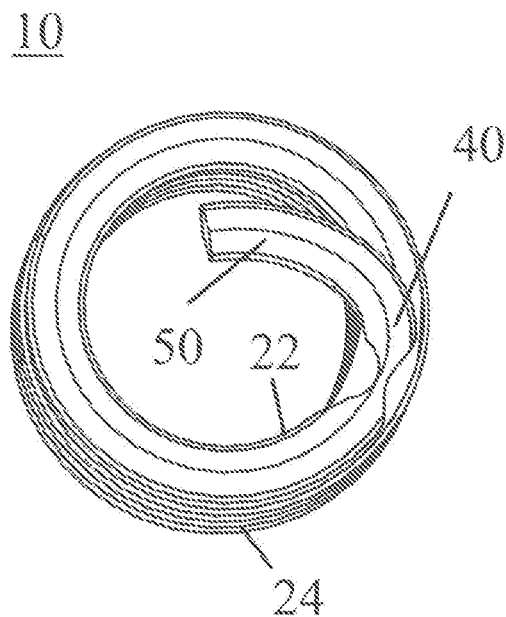
Figure 20:
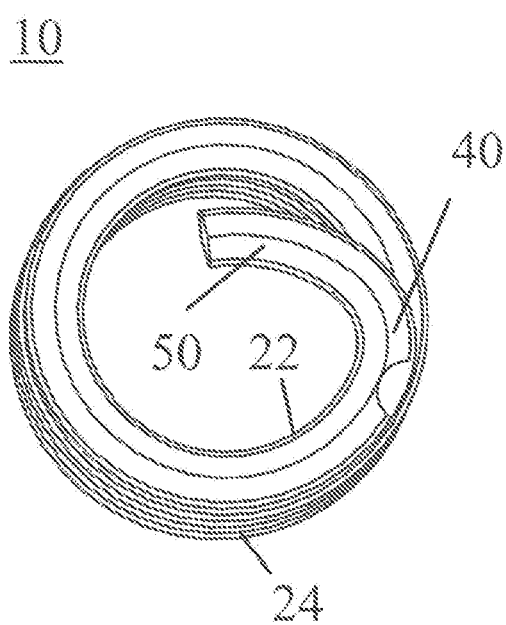
Figure 21:
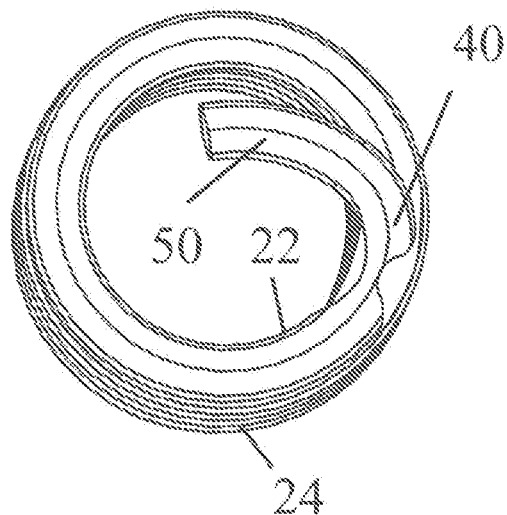
Figure 22:
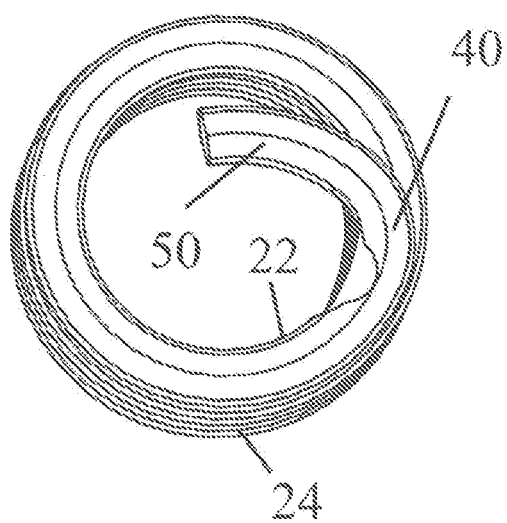
Figure 23:
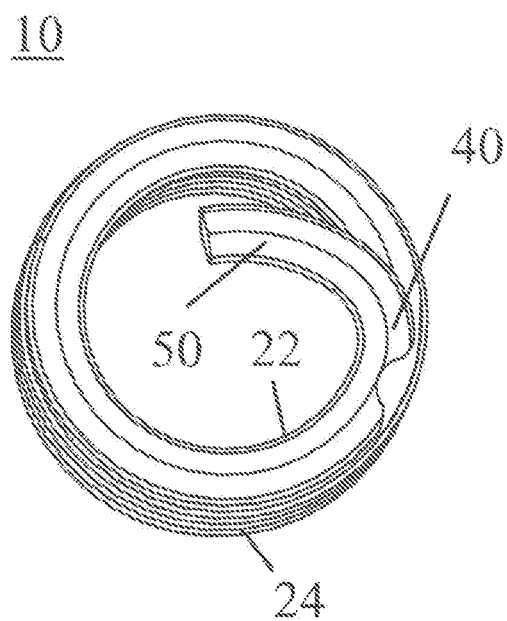

The wire thread insert 10 is manufactured with a device which is shown in FIG. 14 according to one embodiment. A wire D to be wound is suppliable to a rotatably arranged winding spindle W via a wire supply DZ. The winding spindle W comprises on its front end a locking construction (not shown). The locking construction is formed such that a circular arc shaped curved end $D_1$ of the wire D to be wound is lockable on the front end of the winding spindle W for winding the wire thread insert (step H2). Preferably, the circular arc shaped curved end $D_1$ of the wire D extends over an arc angel of 10° to 180°, preferably 30° to 120°. This circular arc starts in the later bending portion or at the end of the straight section of the wire D to be wound, respectively. This circular arc ends at the free end of the circular arc shaped curved end $D_1$ or at the free end of the later moving tang, respectively.

After providing the wire D to be wound with a circular arc shaped curved end $D_1$ (step H1) and locking the circular arc shaped curved end $D_1$ at the winding spindle W (H2), the winding spindle W winds the wire D up (step H3). By rotating the winding spindle W, the cylindrical helix 20 consisting of the plurality of helically wound coils 30 is created (see above). The locking of the semicircular end $D_1$ of the wire D leads to the forming of the moving tang 50 (see above) already at the beginning of the winding procedure.

After the wire thread insert is completely wound, the wire thread insert is spindled-off from the winding spindle W (step H4). For this purpose, the winding spindle W rotates contrary to the previously used winding direction.

Now, the wire thread insert is only connected with the endless wire D and has to be cut-off therefrom. With the cutting-off (step H6) of the wire thread insert, two preferred objectives are achieved. On the one hand, an upper M1 and a lower knife M2 are used for cutting-off (H6), which cut off the wire thread insert over a shear movement. In contrast to pinching-off, cutting-off (H6) creates a continuous face which forms in the wire thread insert to be formed subsequently the compression face 52 at the moving tang 50 (see above).

On the other hand, the wire thread insert is cut-off with the upper M1 and lower knife M2 such that a semicircular free end of the wire D remains. For this purpose, the wire thread insert is preferably tilted (step H5) related to its longitudinal axis and compared to the longitudinal axis of the winding spindle W before cutting-off (H6). In this way, the end of the wire thread insert to be cut is freely accessible for the knives M1 and M2.

While the cut-off wire thread insert is removed (step H7), the semicircular end of the wire D at the front end of the winding spindle W is locked (step H1 and H2) to wind a further wire thread insert.

The device for manufacturing the wire thread insert comprises further preferably a pointing assembly with which the wire of the bending portion 40 between the first coil 32 of the wire thread insert 10 and the moving tang 50 is modifiable mechanically, geometrically, thermally, chemically or in another way compared to the wire of the remaining wire thread insert 10 to facilitate a redressing of the moving tang 50. The modification of the wire in the bending portion 40 and thus also the pointing assembly are optional. The advantages related to these modifications of the wire in the bending portion are described above.

The pointing assembly P is arranged such that during the manufacturing of the first wire thread insert the pointing or modifying of the wire, respectively, occurs already at the position of the bending portion 40 of the wire thread insert subsequently to be wound. The pointing assembly further comprises for this purpose preferably mechanical devices for milling, punching or the like, as discussed above. They apply for example a rounded groove or a tapering in the later bending portion of the wire thread insert subsequently to be wound.

Alternatively, the pointing assembly comprises an inductor to chemically modify the properties of the wire in the later bending portion 40. It is further conceivable to provide the pointing assembly P with other heat sources or mechanical treatment devices to modify the wire in the later bending portion 40 in a suitable way.

The invention claimed is:

1. An installation tool for a wire thread insert in a receiving thread of a component, wherein the wire thread insert has the following features: a cylindrical helix having a plurality of helically wound coils of a wire, the helix having a first and a second end, wherein a first coil provided at the first end has a moving tang projecting into an interior of the helix via a bending portion and the moving tang is inseparably connected to the first coil and redressable from the interior of the helix via the bending portion, the tool comprising the following features:
   a. a rotatable mounting spindle having a drive end for rotating the mounting spindle and a functional end for installing the wire thread insert, wherein
   b. the functional end comprises
      b1. a moveable compression blade,
      b2. a moving shoulder by means of which the wire thread insert is screwable in a first rotational direction into the receiving thread via the moving tang, and
      b3. a redress shoulder by means of which the moving tang during rotation of the mounting spindle in a second rotational direction is radially outwardly movable and redressable in combination with the moveable compression blade,
   c. the compression blade is arranged pivotably around an eccentrically arranged point relative to a front end face of the mounting spindle to engage or disengage the mounting tang, and,
   d. during rotation of the functional end in a second direction, the functional end is adapted
      d1. to radially and outwardly bend-up the moving tang by the redress shoulder and
      d2. to compress the moving tang at a front end of a free end of the tang via the compression blade extending in the radial direction and projecting over and above the mounting spindle so that
      d3. the moving tang is permanently redressable into the receiving thread of the component.

2. Installation tool according to claim 1, the mounting spindle of which has an outer diameter at the functional end so that the wire thread insert may be spindled or slipped on.

3. An installation tool for a wire thread insert in a receiving thread of a component, wherein the wire thread insert has the following features: a cylindrical helix having a plurality of helically wound coils of a wire, the helix having a first and a second end, wherein a first coil provided at the first end has a moving tang projecting into an interior of the helix via a bending portion and the moving tang is inseparably connected to the first coil and redressable from the interior of the helix via the bending portion, the tool comprising the following features:
   a. a rotatable mounting spindle having a drive end for rotating the mounting spindle and a functional end for installing the wire thread insert, wherein
   b. the functional end comprises
      b1. a moveable compression blade,
      b2. a moving shoulder by means of which the wire thread insert is screwable in a first rotational direction into the receiving thread via the moving tang, wherein the moving shoulder comprises a moving groove and an engagement slant is arranged on the moving shoulder for facilitating a locking and ensuring an engagement of the moving tang on the moving shoulder, and
      b3. a redress shoulder by means of which the moving tang during rotation of the mounting spindle in a second rotational direction is radially outwardly movable and redressable in combination with the moveable compression blade, wherein the redress shoulder comprises a redress groove,
   c. the compression blade is arranged pivotably around an eccentrically arranged point related to a front end face of the mounting spindle to engage or disengage the mounting tang, and,
   d. during rotation of the functional end in a second rotational direction, the functional end is adapted
      d1. to radially and outwardly bending-up the moving tang by the redress shoulder and
      d2. to compress the moving tang at a front end of a free end of the tang via the compression blade extending in the radial direction and projecting over and above the mounting spindle so that
      d3. the moving tang is permanently redressable into the receiving thread of the component.

\* \* \* \* \*